United States Patent
Gorski

[11] Patent Number: 6,147,864
[45] Date of Patent: Nov. 14, 2000

[54] APPARATUS FOR ATTACHING A REMOTE CONTROL DEVICE

[75] Inventor: Ryan F. Gorski, Salix, Iowa

[73] Assignee: Gateway 2000, Inc., North Sioux City, S. Dak.

[21] Appl. No.: 09/261,697

[22] Filed: Mar. 3, 1999

[51] Int. Cl.[7] .............................. H05K 5/02; H05K 7/14; G06F 1/16

[52] U.S. Cl. .......................... 361/686; 361/683; 361/680; 361/681; 361/727; 364/708.1

[58] Field of Search .................................... 361/683, 680, 361/686, 681, 682, 727; 248/346.01, 346.05; 206/305, 320; 345/163–169, 709.12; 364/708.1, 709.01

[56] References Cited

U.S. PATENT DOCUMENTS

| | | | |
|---|---|---|---|
| D. 304,180 | 10/1989 | Gibson | D14/114 |
| D. 336,197 | 6/1993 | Wilcox | D6/570 |
| D. 372,706 | 8/1996 | Cyr | D14/114 |
| D. 380,462 | 7/1997 | Wilson | D14/114 |
| D. 392,955 | 3/1998 | Wilson | D14/114 |
| 4,689,761 | 8/1987 | Yurchenco | 364/708 |
| 4,913,387 | 4/1990 | Tice | 248/918 |
| 5,126,955 | 6/1992 | Tomoda | 364/708.1 |
| 5,305,181 | 4/1994 | Schultz | 361/680 |
| 5,409,107 | 4/1995 | Browne | 206/305 |
| 5,428,355 | 6/1995 | Jondrow et al. | 341/20 |
| 5,433,407 | 7/1995 | Rice | 248/118.1 |
| 5,438,530 | 8/1995 | Bettini | 364/709.11 |
| 5,443,237 | 8/1995 | Stadtmauer | 248/441.1 |
| 5,490,039 | 2/1996 | Helms | 361/683 |
| 5,490,647 | 2/1996 | Rice | 248/118.1 |
| 5,506,749 | 4/1996 | Matsuda | 361/683 |
| 5,509,628 | 4/1996 | Noble | 248/118 |
| 5,546,334 | 8/1996 | Hsieh et al. | 364/709.11 |
| 5,570,268 | 10/1996 | Selker | 361/683 |
| 5,605,311 | 2/1997 | McGrath et al. | 248/118 |
| 5,615,083 | 3/1997 | Burnett | 361/686 |
| 5,615,393 | 3/1997 | Kikinis et al. | 395/887 |
| 5,619,395 | 4/1997 | McBride | 361/683 |
| 5,628,483 | 5/1997 | Smith et al. | 248/118 |
| 5,636,822 | 6/1997 | Hendershot et al. | 248/346.01 |
| 5,661,633 | 8/1997 | Patret | 361/683 |
| 5,675,524 | 10/1997 | Bernard | 364/705.05 |
| 5,704,698 | 1/1998 | Lin | 312/208.1 |
| 5,730,408 | 3/1998 | McAllister et al. | 248/288.51 |
| 5,771,814 | 6/1998 | Clausen | 108/93 |
| 5,832,840 | 11/1998 | Woof | 108/6 |
| 5,845,884 | 12/1998 | Terbrack | 248/118 |
| 5,876,002 | 3/1999 | White et al. | 248/118 |
| 5,901,934 | 5/1999 | Wilson | 248/346.01 |
| 5,927,662 | 7/1999 | West et al. | 248/118 |

*Primary Examiner*—Leo P. Picard
*Assistant Examiner*—Anatoly Vortman
*Attorney, Agent, or Firm*—Schwegman, Lundberg, Woessner & Kluth, P.A.; Joseph H. Lee

[57] ABSTRACT

A device is provided for coupling a graphical pointing device with a data input device. A sheath having a cavity therein couples with the data input device, where the sheath has an arm coupled with the sheath. The sheath has a cut out in the top surface so that a user has access to selection devices of the data input device. In addition, the sheath can have at least one cut out in the bottom surface to allow for actuation of an elevation foot coupled with the data input device. The arm has a holding structure which can frictionally engage the graphical pointing device therein. The data input device can alternatively have a recess in which a support arm is received. The support arm is removably disposed within the recess of the data input device and is adapted to couple with the graphical pointing device.

10 Claims, 6 Drawing Sheets

APPARATUS FOR ATTACHING A REMOTE CONTROL DEVICE

FIELD OF THE INVENTION

The present invention relates generally to electronic devices incorporating remote devices. More particularly, it pertains to an apparatus for coupling a remote device with an electronic apparatus.

BACKGROUND OF THE INVENTION

As consumers purchase more individual electronic components for their home, where each component is equipped with a remote control, the several remote controls become difficult to keep track of and can become misplaced. The remote controls can become lost in the seat cushions of a couch, or a user may inadvertently walk out of the room, leaving the remote control behind in another room. In addition to the typical plurality of components for a typical media room, a trend in the home entertainment industry is that home entertainment components, such as televisions, and computers are merging. One currently available system is a product available from Gateway 2000 called the Destination product.

Gateway 2000's Destination product is a multipurpose computer system provided with circuitry to control consumer electronics, such as a large monitor or television for group interaction and of text, graphics and video in a home entertainment environment. The merged home entertainment and computer products, such as Gateway 2000's Destination product are being designed for use in a home entertainment environment since people are using these systems in living rooms rather than home offices. In other words, combining a computer with a home entertainment system has had the effect of moving the home personal computer of the desk in home office and into the main living space of the user's home. This also means that the peripheral devices normally used with the computers, such as a mouse, will also be used in the main living space of the user's home. Similar to the remote controls discussed above, the smaller peripheral devices, especially those devices which operate wireless, are susceptible to becoming misplaced away from the system. Accordingly, what is needed is a better way of tracking the location of a remote control device, such as a cordless mouse.

SUMMARY OF THE INVENTION

An apparatus is provided which attaches a cordless mouse to a data input device. The apparatus includes a sheath which has a cavity therein adapted to couple with a keyboard. The sheath includes an arm adapted to couple with a remote control device, such as a cordless mouse. In one configuration, the arm includes a coating to frictionally engage the remote control device therewith. The arm, in one embodiment, is coupled with the sheath on the first side surface of the sheath. The arm, in another embodiment, is removably coupled with the sheath.

In another configuration, the apparatus includes a data input device defined in part by a top surface, a bottom surface, and a first side surface, where the bottom surface is adapted to rest upon a base surface, such as a coffee table or a desk. The data input device includes a recess adapted to receive a support arm. The support arm is adapted couple with a remote control device such as a cordless mouse. Cutouts are provided, in another embodiment, to accommodate flip-down feet of the data input device, selection buttons, and the like.

In yet another embodiment, a system is provided which includes a computerized electronics device, a display coupled with the computerized electronics device, and a data input device. A sheath is also provided which encompasses a portion of the data input device such that the sheath is coupled with the data input device. Coupled with the sheath is an arm which is adapted to retain a remote control device, such as a cordless mouse, thereto.

The coupling device provides many advantages in that a storage space is provided for a remote control device which is used for electronic systems. The storage space is conveniently coupled with the data input device such that the remote control device can always be located. In addition, the remote control device can be stored in a convenient location which is proximate to a data input device.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
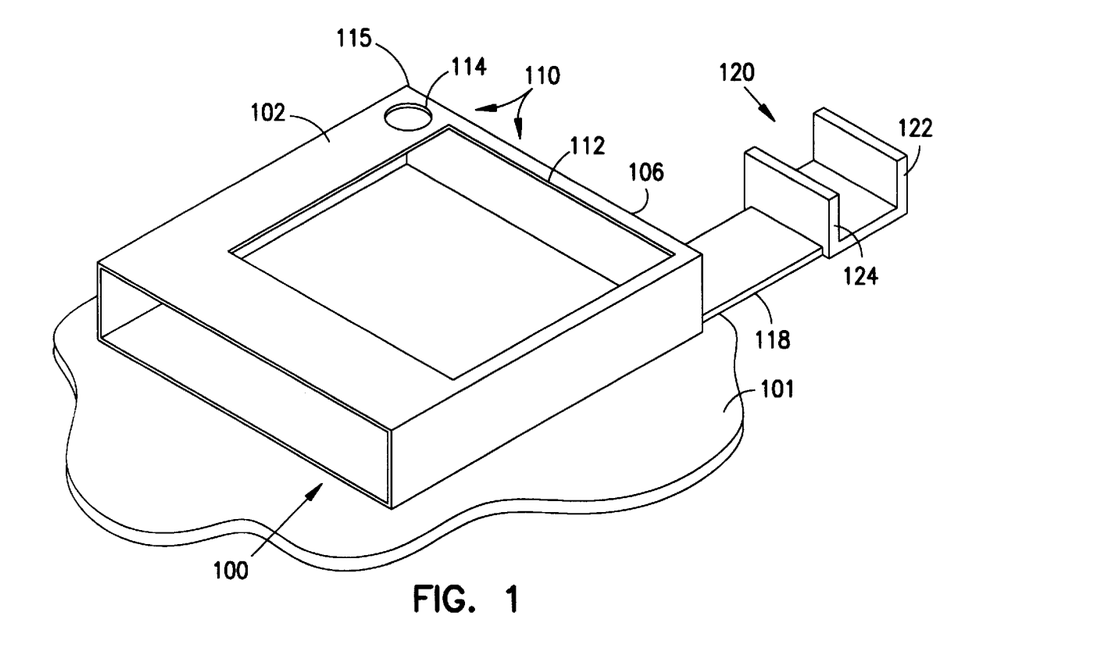
FIG. 1 is a perspective view illustrating a coupling device constructed in accordance with one embodiment of the present invention.
Figure 2:
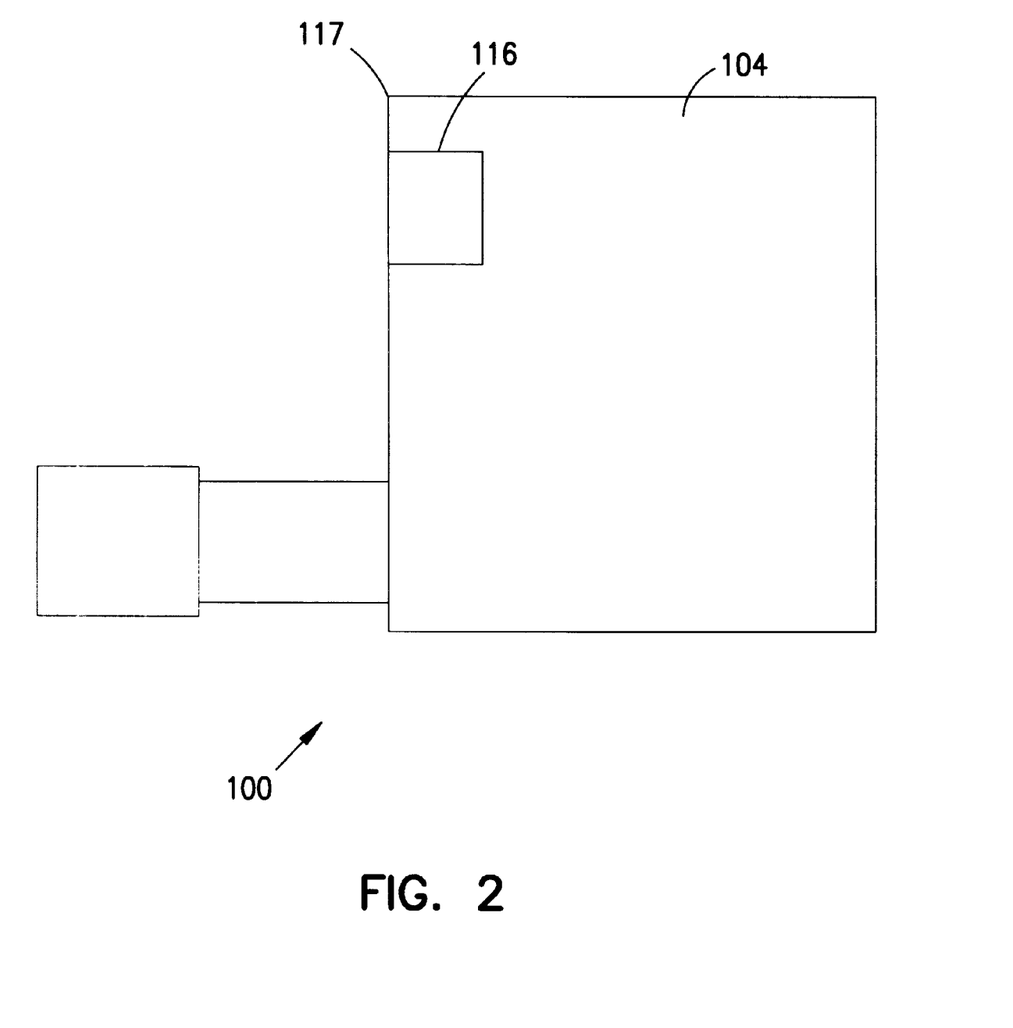
FIG. 2 is a bottom plan view illustrating a coupling device constructed in accordance with another embodiment of the present invention.
Figure 3:
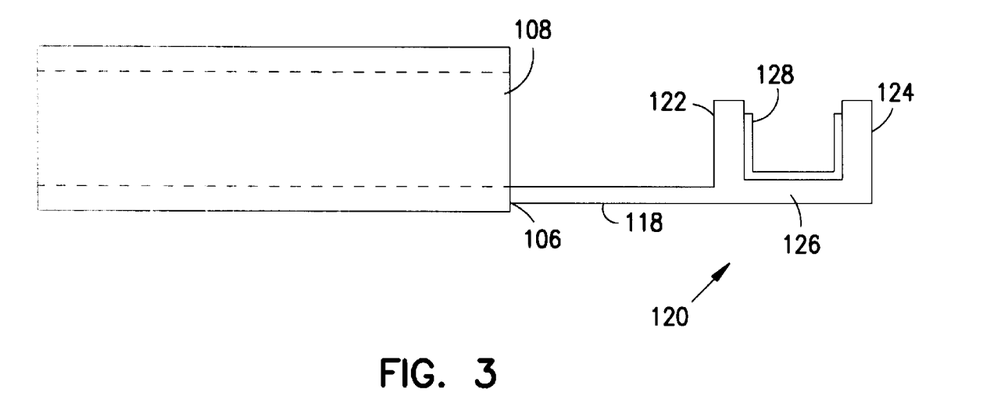
FIG. 3 is a first side elevational view illustrating a coupling device constructed in accordance with yet another embodiment of the present invention.

A device is provided for attaching a remote control device to a data input device, such as a keyboard. FIG. 1 illustrates one embodiment of the present invention. A sheath 100 is shown, which is adapted to encompass a portion of a data input device (not shown). In one embodiment, the sheath 100 is integrally formed of rigid material, such as plastic. In another embodiment, the sheath 100 is molded from thermoplastic material. The sheath 100, also shown in FIGS. 2 and 3, is defined in part by a top surface 102, a bottom surface 104, and at least a first side surface 106. The bottom surface 104 is adapted to be placed upon a base surface 101, such as a desk. In one configuration, the top surface 102 is an opposite surface to the bottom surface 104. In another embodiment, the side surface 106 is disposed transverse to the top surface 102 and the bottom surface 104. When the sheath 100 is placed on a base surface, a user can easily interact with the top surface 102 of the sheath 100. The surfaces 102, 104 and 106 define the sheath 100 which also includes a cavity 108 therein. The cavity 108 is adapted to receive the data input device (FIG. 7) therein. In one embodiment, side surface 106 is open such that a data entry device can be extended therethrough. Alternatively, in another embodiment, side surface 106 is closed, for instance, by a panel. Having a closed side surface 106 assists in properly orienting the sheath 100 relative to the data entry device.

Disposed within the top surface 102 of the sheath 100, in one embodiment, is at least one cutout. In another embodiment a plurality of cutouts 110 are provided, as shown in more detail in FIG. 1. In one embodiment, the cutouts 110 comprise a first top cutout 112, and a second top cutout 114. The first top cutout 112 is adapted to allow access to a portion of the data input device (not shown), and in one embodiment comprises a square-shaped opening.

In one configuration, the first top cutout 1 12 is centrally disposed within the top surface 102 such that a user can easily access selection buttons 313 (FIG. 7) of the keyboard. In another embodiment, the second top cutout 114 is sized and positioned to allow a user to have access to a power button (not shown). In another embodiment, the second top cutout 114 comprises a circularly shaped opening and is disposed proximate an upper comer 115 of the sheath 100. Additional or alternative cutouts can also be provided or modified in size, shape, or position to allow access to other portions of the data input device (not shown) when the sheath 100 is installed thereon.

Figure 7:
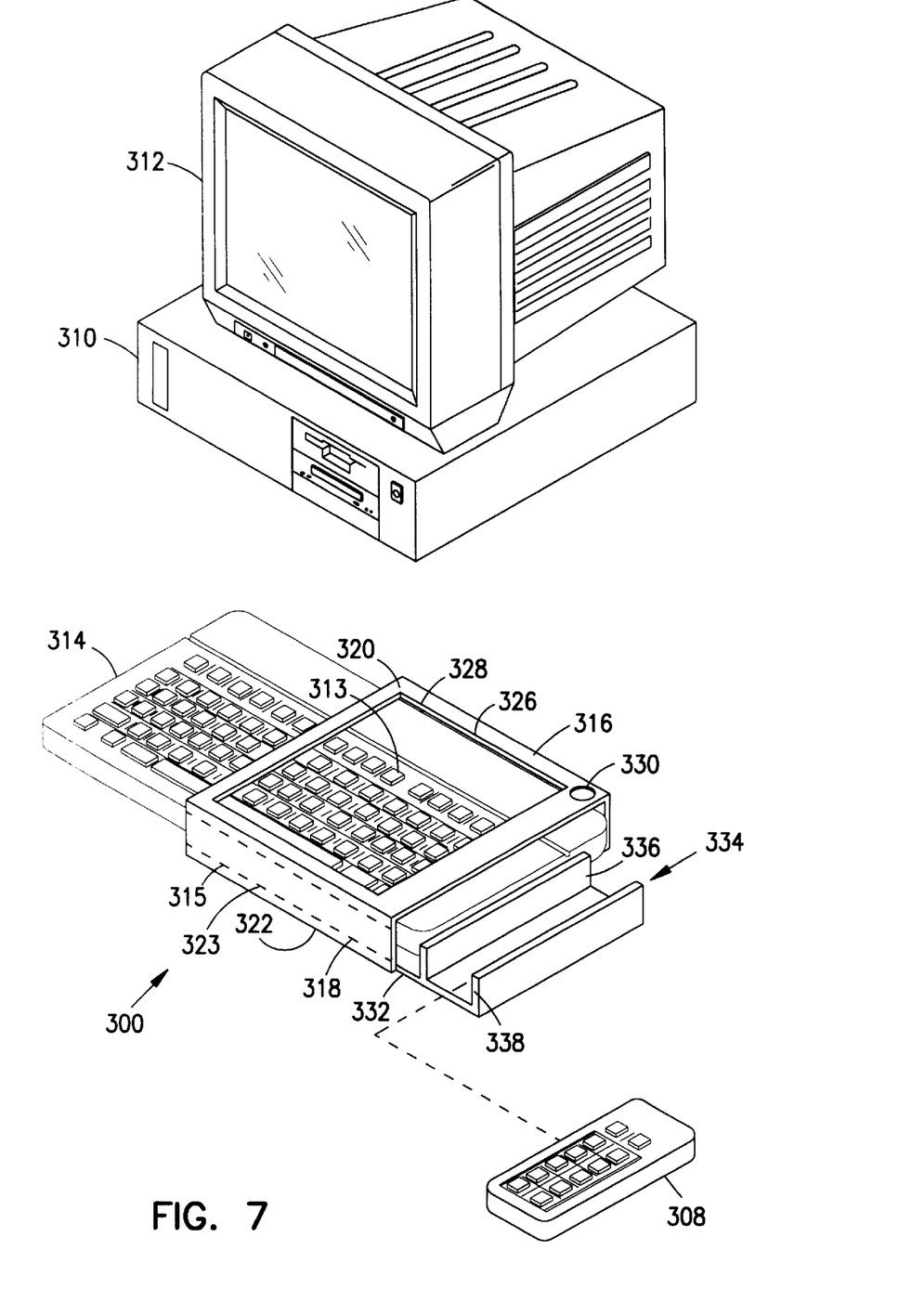
FIG. 7 is a perspective view illustrating a system constructed in accordance with one embodiment of the present invention.

An arm 118 is provided in one embodiment which is coupled with the sheath 100. The arm 118, in one embodiment, is coupled with the side surface 106 of the sheath 100. The arm 118 can be of varying lengths and widths, and, in one embodiment, is removably coupled with the sheath 100. In another embodiment, the arm 118 is integrally formed with the sheath 100. The arm 1 18 further comprises a holding structure 120, which is adapted to receive a remote control device therein (FIG. 7). Alternatively, the holding structure 120 can be configured to couple with at least a portion of the remote control device (FIG. 7).

The holding structure 120, in one embodiment, comprises a first side wall 122 and a second side wall 124. In another configuration, the first side wall 122 and the second side wall 124, shown in more detail in FIG. 3, are adapted to retain the remote control device (FIG. 7) therebetween. In another embodiment, the first side wall 122 and the second side wall 124 are adapted to frictionally engage the remote control device therein. For example, the first side wall 122 and the second side wall 124 are positioned parallel to each other, where the distance between them is smaller than the width of the remote control device (FIG. 7). Alternatively, in yet another configuration, the holding structure 120 further includes a third wall 126 which, in combination with the first side wall 122 and the second side wall 124, is adapted to cradle the remote control device (FIG. 7) within the holding structure 120. For example, the remote control device (FIG. 7) rests upon the third wall 126 between the first side wall 122 and the second side wall 124. In yet another embodiment, the holding structure 120 has a coating 128 (FIG. 3), for instance a rubber coating, disposed thereon. The coating 128 is also adapted to engage with the remote control device (FIG. 7). In one embodiment, the coating 128 is sized and positioned to frictionally engage with the remote control device (FIG. 7).

FIG. 2 illustrates a bottom view of the sheath 100. In one embodiment, the sheath 100 includes at least one bottom cutout 116. The bottom cutout 116 is, in one configuration, sized and positioned to allow for flip-down feet (not shown) disposed on the data input device (FIG. 7) to be manipulated, as needed by a user. In one embodiment, the bottom cutout 116 is disposed proximate an upper corner 117 of the bottom surface 104 of the sheath 100. The bottom surface 104 of the sheath 100 can also contain additional or modified cutouts if necessary to accommodate other structures and/or devices located on the bottom surface 104 of the sheath 100.

Figure 4:
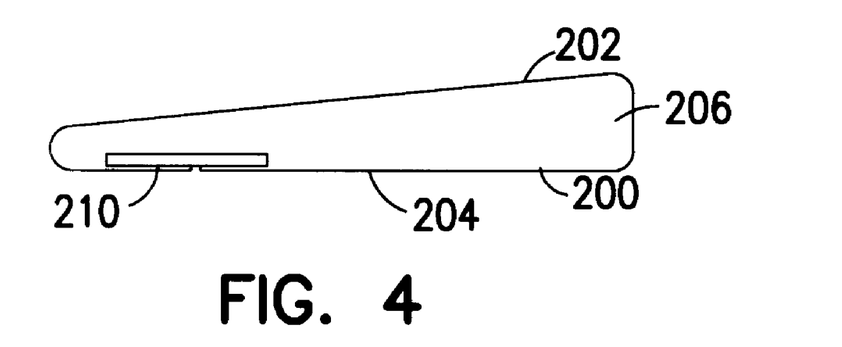
FIG. 4 illustrates a first side elevational view illustrating a data input device for use with a coupling device, constructed in accordance with one embodiment of the present invention.

FIGS. 4, 5, 6A, and 6B illustrate another embodiment of the present invention. In this configuration, a data input device 200, such as a keyboard, is adapted to receive a holding structure 230 therein. As illustrated in FIG. 4, the data input device 200 is defined by a top surface 202, a bottom surface 204, and a first side surface 206. In one configuration, the top surface 202 is an opposite surface to the bottom surface 204. In another embodiment, the side surface 206 is disposed transverse to the top surface 202 and the bottom surface 204.

Input components (FIG. 7), such as keys, a touchpad, a roller ball, etc., are operatively coupled with the data input device 200, in one embodiment, on at least the top surface 202. In another configuration, a recess 210 is disposed in the first side surface 206 of the data input device 200. Alternatively, in another embodiment, the recess 210 and/or additional recesses are disposed on other surfaces of the data input device 200 and are considered within the scope of the invention. The recess 210 is sized to receive therein an arm 212, discussed further below.

Figure 5:
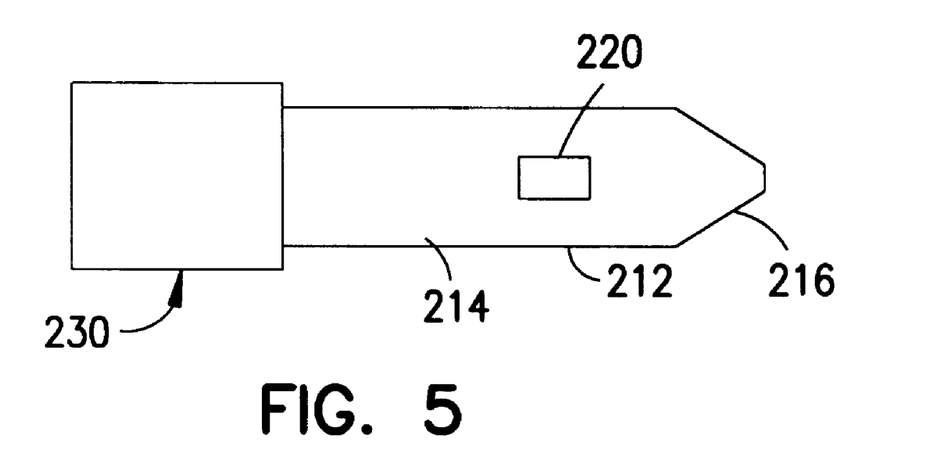
FIG. 5 illustrates a bottom plan view illustrating a coupling device constructed in accordance with one embodiment of the present invention.

FIG. 5 illustrates an arm 212 and a holding structure 230 of the previously discussed embodiment. The arm 212 includes a tongue portion 214. In one embodiment the tongue 214 has a tapered portion 216 which facilitates insertion of the arm 212 into the recess 210 of the data input device 200. In another configuration, the arm 212 includes a cavity 220 which is adapted to engage a portion of the data input device 200 upon insertion of the tongue 214 into the data input device 200. Alternatively, the cavity 220, in another embodiment, is formed on a portion of the data input device 200 is engaged by a projection of the arm 212, as further described below.

Figure 6A:
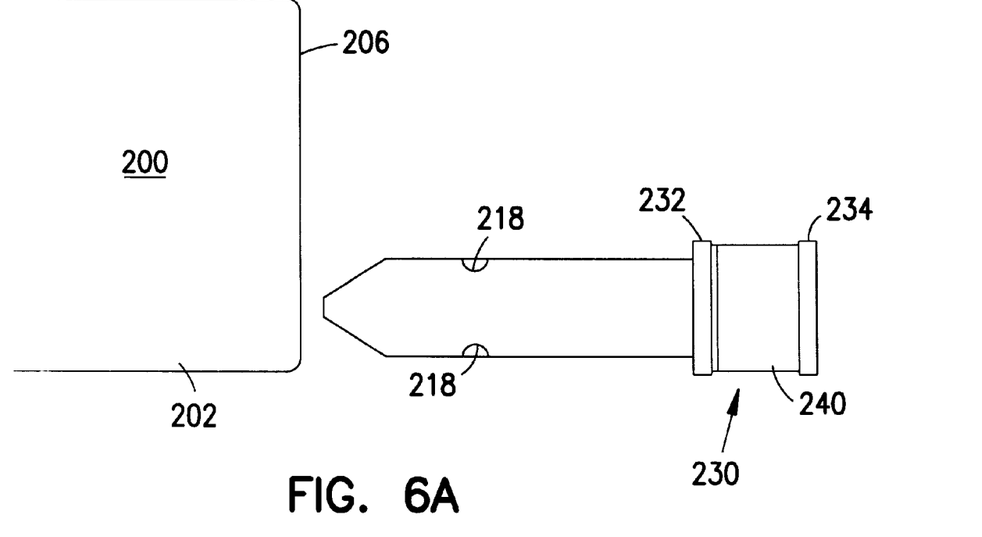
FIG. 6A is a top plan view illustrating a data input device and a coupling device constructed in accordance with another embodiment of the present invention.
Figure 6B:
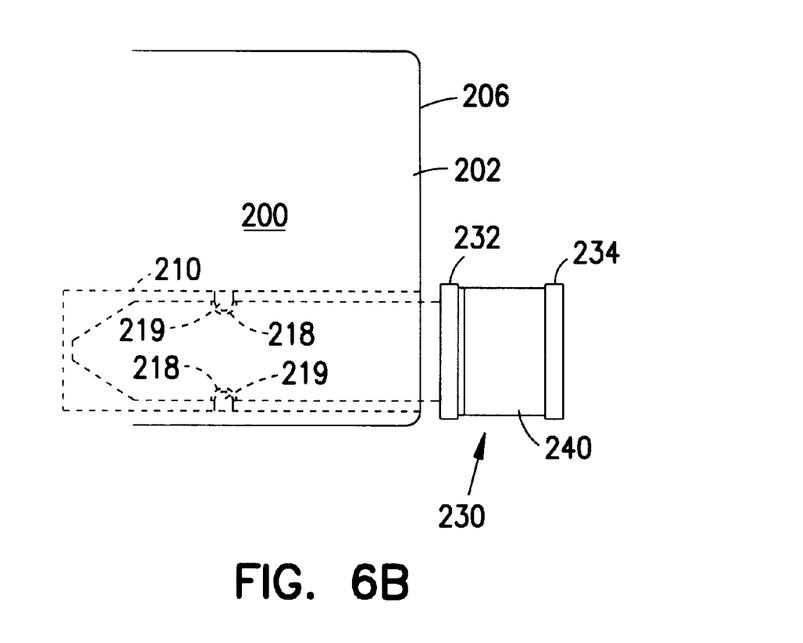
FIG. 6B is a top plan view illustrating a data input device and a coupling device constructed in accordance with another embodiment of the present invention.

The arm 212 also includes a holding structure 230, as discussed in the previous embodiment shown in FIGS. 1–3. As shown in FIG. 6, the holding structure 230, in another embodiment, includes a first side wall 232 and a second side wall 234. The holding structure 230 is adapted to receive the remote control device (FIG. 7) therebetween. In yet another configuration, the holding structure 230 further includes a third wall 240. The first side wall 232, the second side wall 234, and the third wall 240, in one embodiment, are adapted to cradle the remote control device (not shown) therein. In yet another configuration, the arm 212 includes at least one detent which is adapted to receive therein a portion of the data input device 200. In one embodiment, a plurality of detents 218 are provided. The detents 218 are sized and positioned to engage or couple with a projection 219 or equivalent that is disposed within the recess 210 of the data input device 200.

To use the holding structure 230 shown in FIGS. 4, 5, 6A and 6B, the arm 212 is inserted into the recess 210 of the data input device 200. When the arm 212 is installed, the tongue 214 is disposed within the data input device 200 as shown in more detail in FIG. 6B. The remote control device (not shown) is disposed within the holding structure 230 and retains the remote control device to the holding structure 230. The holding structure 230 couples and/or engages the remote control device with the data input device 200. Alternatively, the holding structure 230 can be removed from the data input device 200 when it is not needed.

In another configuration as illustrated in FIG. 7, a system 300 is provided. The system 300 includes at least one electronic device 310, such as a computer, a display 312, and a data input device 314. A remote control device 308 is provided which is adapted to wirelessly control the electronic device 310. A coupling device 315 is also provided for coupling the remote control device 308 with the data input device 314.

In one embodiment, the coupling device 315 comprises a sheath 316 which has a cavity 318 therein. The sheath 316 is defined by a top surface 320, a bottom surface 322, and at least a first side surface 324. The bottom surface 322, in one embodiment, is adapted to be placed upon a base surface (not shown), for instance a table or a desktop. In addition, the coupling device 315, in another embodiment, includes at least one cutout. In one embodiment, a plurality of cutouts 326 are provided. In another embodiment, the cutouts 326 comprise at least a first top cutout 328. In yet another embodiment, the cutouts include a second top cutout 330. The sheath 316 is adapted to encompass at least a portion of the data input device 314 as shown in FIG. 7. Alternatively, in another configuration, the coupling device 315 comprises the embodiments shown in FIGS. 6A and 6B.

The sheath 316 includes an arm 332. In one embodiment, the arm 332 includes a holding structure 334 which is adapted to receive the remote control device 308 therein. Alternatively, the holding structure 334 can couple with the remote control device 308 in other manners. In one configuration, the holding structure 334 includes a first side wall 336, and a second side wall 338. In another configuration, the holding structure 334 further includes a bottom wall 340. The first side wall 336, the second side wall 338, and the bottom wall 340 are adapted to cradle the remote control device 308 therein. In another embodiment, the holding structure 334 is adapted to frictionally engage with the remote control device 308. In yet another configuration, either the remote control device 308 or the holding structure 334 can have mating projections and/or recesses to engage one another as the remote control device 308 is coupled with the holding structure 334.

To use the coupling device 315 of the system 300, the sheath 316 is placed adjacent to the data input device 314. The sheath 316 is coupled with the data input device 314 such that the data input device 314 is inserted into a cavity 323 of the sheath 316. The sheath 316 is moved relative to the data input device 314 until the cut outs 326 are properly positioned with respect to input buttons 313 of the data input device 314 such that a user can have access to both the sheath 316 and the input buttons 313.

The remote control device 308 is disposed within the holding structure 230 and retains the remote control device to the holding structure 230. The coupling device 315 couples and/or engages the remote control device 308 with the data input device 314. Alternatively, the coupling device 315 can be removed from the data input device 314 when not needed.

The coupling device provides many advantages in that a storage space is provided for a remote control device which is used for electronic systems. The storage space is conveniently coupled with the data input device such that the remote control device can always be located. In addition, the remote control device can be stored in a convenient location which is proximate to a data input device.

It is to be understood that the above description is intended to be illustrative, and not restrictive. Many other embodiments will be apparent to those of skill in the art upon reading and understanding the above description. The attachment device can be used in conjunction with a number of electronic components and/or systems. The scope of the invention should, therefore, be determined with reference to the appended claims, along with the full scope of equivalents to which such claims are entitled.

What is claimed is:

1. An apparatus for attaching a cordless mouse to a data input device, the apparatus comprising:

a sheath having a cavity therein, the cavity configured to receive at least a portion of a keyboard therein, the sheath having a top surface, a bottom surface, and a first side surface;

an arm coupled with the sheath on the first side surface; and the arm configured to couple a cordless mouse therewith.

2. The apparatus as recited in claim 1, further comprising a holding structure coupled with the arm, the holding structure configured to receive a cordless mouse therein.

3. The apparatus as recited in claim 2, wherein the holding structure comprises a first side wall and a second side wall, the first side wall and the second side wall sized and positioned to receive a cordless mouse therebetween.

4. The apparatus as recited in claim 2, wherein the holding structure is configured to form a cavity, and a rubber coating is disposed on a surface of the cavity.

5. The apparatus as recited in claim 1, further comprising a cordless mouse coupled with at least a portion of the arm.

6. The apparatus as recited in claim 1, wherein the sheath is defined in part by a top surface and a bottom surface, the sheath having at least one cutout disposed in the top surface.

7. The apparatus as recited in claim 6, wherein the sheath has at least one cutout disposed in the bottom surface.

8. An apparatus comprising:

a data input device having a top surface, a bottom surface, and at least a first side surface, the bottom surface configured to rest upon a base surface;

at least one of the surfaces of the data input device having a recess therein; and a support arm adapted to be received within the recess, the support arm configured to removably couple a cordless mouse therewith;

wherein the support arm further comprises a tapered portion.

9. An apparatus comprising:

a data input device having a top surface, a bottom surface, and at least a first side surface, the bottom surface configured to rest upon a base surface;

at least one of the surfaces of the data input device having a recess therein; and a support arm adapted to be received within the recess, the support arm configured to removably couple a cordless mouse therewith; and a holding structure coupled with the support arm, the holding structure configured to receive a cordless mouse therein;

wherein the holding structure comprises a first side wall and a second side wall, the first side wall and the second side wall sized and positioned to receive a cordless mouse therein.

10. An apparatus comprising:

a data input device having a top surface, a bottom surface, and at least a first side surface, the bottom surface configured to rest upon a base surface;

at least one of the surfaces of the data input device having a recess therein;

a support arm configured to be received within the recess and further configured to couple a cordless mouse therewith, wherein the support arm is removably coupled with the data input device;

the support arm comprising a tapered portion;

a holding structure integrated with the support arm, the holding structure comprising a first side wall and a second side wall, the first side wall and the second side wall sized and positioned to receive a cordless mouse therein; and a cordless mouse coupled with the holding structure.

* * * * *